Feb. 10, 1970    N. T. SPARKS    3,494,397
EGGSHELL CRACKER
Filed Aug. 11, 1967
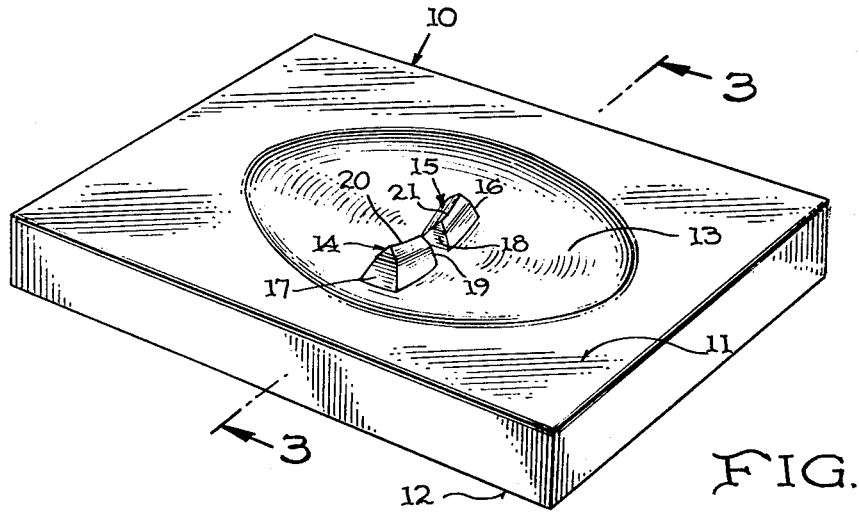
FIG. 1.
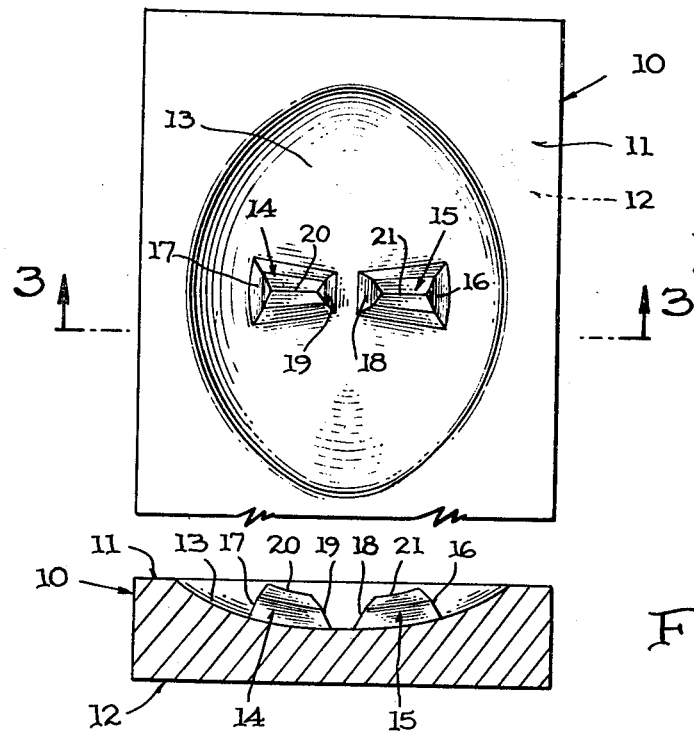
FIG. 2.
FIG. 3.
INVENTOR
NED T. SPARKS
BY *Edwin E. Greigg*
ATTORNEY

United States Patent Office 3,494,397
Patented Feb. 10, 1970

3,494,397
EGGSHELL CRACKER
Ned Thomas Sparks, 1613 N. Springwood Drive,
Silver Spring, Md. 20910
Filed Aug. 11, 1967, Ser. No. 660,080
Int. Cl. A23p 1/00; A47j 43/14
U.S. Cl. 146—2
6 Claims

ABSTRACT OF THE DISCLOSURE

The invention relates to a device for cracking the shells of eggs without fracturing the yolk thereof. The device includes a base member having planar surfaces with a concave recess provided in one surface of the base member. Within the recess of the base member are positioned fracture means that are disposed medially and transversely of the concave recess and which extend upwardly therefrom. The fracture means include an upper extremity that terminates in a knife-like edge portion.

---

This invention relates to novel means for cracking the shells of eggs without fracturing the yolks thereof.

It is well known to the average individual, particularly chefs, bakers and housewives, who have had any culinary experience that the shells of chicken eggs vary considerably in thickness as well as hardness and as a consequence the shell of the egg must be cracked with delicacy and considerable care in order to prevent breaking the egg yolk. Of course, in some instances depending upon in what form the broken egg is to be utilized, it is of no consequence whether the yolk of the egg is broken or not, e.g., when making scrambled eggs. However, where one or many eggs are to be broken and it is desired that not one yolk be broken, it is very desirable to have a suitable device for this purpose.

As far as now known to the inventor, the average person who is planning to break the shell of an egg will either crack the egg against the edge of a skillet or other pan or the front of a cooking range. Still others will hold the egg in one hand and strike the shell with a hard object such as an edge of a knife, fork, spoon, or other hard implement.

Accordingly, it is the primary object of the invention to enable the least experienced individual to break the shell of an egg without ever breaking the yolk thereof.

Another object of the invention is to provide a device of such a simplified construction that it will be inexpensive to manufacture, thereby enabling those with the most modest income to be able to purchase this improved eggshell cracker and then prepare an egg for consumption in the manner they desire.

Still another object of the invention is to provide an article of manufacture which can be prepared from a small piece of wood, such as walnut, by a moderately skilled workman with a minimum of tools.

Yet another object of the invention is to provide an eggshell cracking device which can be made in one piece or several pieces as preferred.

These and other objects and advantages will become apparent from the following description taken in conjunction with the accompanying drawings, in which:

FIG. 1 is a perspective view of the preferred embodiment of the novel eggshell cracker;

FIG. 2 is a plan view of the eggshell cracking device illustrating the transversely aligned shell fracturing means that are positioned in an ellipsoidal shaped recess; and FIG. 3 is another embodiment of the view illustrating a single fracturing means for an eggshell.

Turning now to the drawings, the perspective view of the novel eggshell cracking device indicated generally at 10 may be constructed of premium grades of wood such as walnut, mahogany or other expensive wood or even an inexpensive wood, such as oak, etc. Although it is not now contemplated to make the eggshell cracker from plastic material, this is conceivable, but would require considerable cost for the molding dies. However, it will be immediately apparent that the structure, being of such a simple design, could be constructed of any suitable thermosetting or thermoplastic material as well as glass, aluminum or other metals.

The eggshell cracker is provided with spaced planar surfaces 11 and 12 constituting the top and bottom respectively of a block of wood, the upper surface provided with a dished out or recessed area 13 generally resembling a portion of an ellipsoid.

The ellipsoidal area provided in the top one of the planar surface of the block 10 is provided with unequal width and length dimensions which will be best understood from a study of FIGURES 1 and 2. The shape of the concave recess 13 provided in the block 10 has a very important function and attention is directed to the fact that the base of this recessed area, shown in the drawing, substantially simulates the side face of a large egg, the latter not being shown in the drawing.

In all figures of the drawing, except FIG. 3, there is shown the preferred embodiment of the invention in which the recessed area 13 is provided with a pair of spaced eggshell fracturing means 14, 15, which are disposed laterally of the narrowest dimension of the block 10. It will be observed from an examination of the perspective view of FIG. 1 that each of the outwardly disposed surfaces of the fracturing means, in side elevation, that is, 16, 17, simulates an A. The confronting or oppositely disposed surfaces 18, 19 of the fracturing means also are of A form and by referring at this time to the view in FIG. 3, it will be noted that these two surfaces are connected by downwardly sloping ridges 20 and 21.

When it is desired to crack the shell of an egg, it is first taken in the hand and rested on the fracturing means. Then it is raised to a height of about one to two inches above the fracturing means, and then lowered quickly, but in a moderate manner, by a snap of the wrist, at which time the spaced ridges pierce or puncture the eggshell and the ellipsoidal surface of the eggshell is brought to rest against the uniform shock-absorbing concave recess 13 which substantially corresponds to the shape of the eggshell.

Although an eggshell cracked by this device is not depicted in the drawing, it will be seen, upon using this device, that the eggshell is provided with two spaced, transversely extending, slotted, punctured areas which are interconnected by a very thin or hairline crack. By pulling the eggshell apart after cracking, the egg may be deposited in a pan, skillet or other means for further use or the white of the egg may be separated from the yolk.

It is further contemplated that the entire upper surface area of the block, particularly when made of wood, may be covered with a sheet of foam plastic which is adhesively applied to the surface and through which the fracturing means can be arranged to extend with the sheet of foam plastic being adhesively secured to the upper surface, or at least to the recessed area in which the fracture means are arranged. The foam plastic may have applied to its upper surface as well as the edge portion adjacent to its point of juncture with the block 10 a non-absorbent skin or sheet surface which will enable the device to be readily washed without having the foam plastic surface area subject to absorbing the water used to wash the device. Also, when a soft wood, such as pine, is utilized, it may have a complete covering of a plasticizer material to prevent water absorption.

Although several embodiments of the invention have been described, it will be apparent that these embodiments are illustrative in nature and that a number of modifications in the apparatus and variations in its end use may be effected without departing from the spirit or scope of the invention as defined in the appended claims.

What is claimed is:

1. A device for facilitating the cracking of the shells of uncooked eggs without fracturing the yolks thereof comprising a base member having planar surfaces, a concave recess including a base in one surface of said base member, said concave recess including an ellipsoidal shaped area, and at least one rigid, immovable transversely arranged fracture means disposed medially of the concave recess and extending upwardly therein and terminating between the plane of the outer perimeter of said recess and the base of said recess, said fracture means having an upper terminal portion defining a knifelike edge portion capable of piercing the shell of the uncooked egg.

2. A device for facilitating the cracking of the shells of eggs as claimed in claim 1, wherein the concave recess has unequal width and length dimensions substantially approximating the contour of an unbroken eggshell.

3. A device for facilitating the cracking of the shells of eggs as claimed in claim 1, wherein the fracture means which extends upwardly from the concave recess comprises a pair of spaced elements including opposed anterior and outwardly directed posterior surfaces, the terminal portions of each of said pair converging toward the anterior surfaces.

4. A device for facilitating the cracking of the shells of eggs as claimed in claim 3, wherein both the anterior and posterior surfaces of the fracture means substantially approximate an inverted V-shaped body in end section.

5. A device for facilitating the cracking of the shells of eggs as claimed in claim 1, wherein the terminal portion of the fracture means lies within the plane of the base member.

6. A device for facilitating the cracking of the shells of eggs as claimed in claim 3, wherein the terminal portion of said spaced fracture means lies within the plane of the base member.

References Cited

UNITED STATES PATENTS

| | | | |
|---|---|---|---|
| 1,322,620 | 11/1919 | Risdon | 146—2 |
| 1,473,383 | 11/1923 | Riker | 146—2 |
| 2,706,507 | 4/1955 | Bartell | 146—2 |
| 3,152,627 | 10/1964 | Pol Janic | 146—2 |

W. GRAYDON ABERCROMBIE, Primary Examiner